(12) United States Patent
Harman

(10) Patent No.: US 6,868,741 B2
(45) Date of Patent: Mar. 22, 2005

(54) DEVICE AND METHOD ENABLING FLUID CHARACTERISTIC MEASUREMENT UTILIZING FLUID ACCELERATION

(75) Inventor: Eric J. Harman, Boulder, CO (US)

(73) Assignee: Veris, Inc., Niwot, CO (US)

( * ) Notice: Subject to any disclaimer, the term of this patent is extended or adjusted under 35 U.S.C. 154(b) by 0 days.

(21) Appl. No.: 10/382,232

(22) Filed: Mar. 5, 2003

(65) Prior Publication Data

US 2004/0173030 A1 Sep. 9, 2004

(51) Int. Cl.⁷ ................................................. G01F 1/46
(52) U.S. Cl. .................... 73/861.65; 73/861.52
(58) Field of Search ........................ 73/861.22, 204.21, 73/204.22, 861.52, 861.61, 861.63–861.65, 861.21, 861.42

(56) References Cited

U.S. PATENT DOCUMENTS

| | | | |
|---|---|---|---|
| 790,888 A | | 5/1905 | Ferris |
| 1,550,124 A | | 8/1925 | Thompson |
| 3,374,673 A | | 3/1968 | Trageser |
| 3,774,645 A | | 11/1973 | Pompa |
| 4,730,500 A | * | 3/1988 | Hughes .................... 73/861.22 |
| 5,036,711 A | | 8/1991 | Good |
| 5,201,216 A | * | 4/1993 | Miyazaki et al. .......... 73/118.2 |
| 5,325,712 A | * | 7/1994 | Tsutsui et al. ............. 73/118.2 |
| 5,329,812 A | * | 7/1994 | Tada et al. ................ 73/204.21 |
| 5,333,496 A | | 8/1994 | Fenelon |
| 5,381,691 A | * | 1/1995 | Miyazaki et al. .......... 73/202.5 |
| 5,398,548 A | | 3/1995 | Ono |
| 5,861,561 A | | 1/1999 | Van Cleve et al. |
| 6,058,787 A | * | 5/2000 | Hughes .................... 73/861.63 |
| 6,247,495 B1 | | 6/2001 | Yamamoto et al. |
| 6,321,166 B1 | | 11/2001 | Evans et al. |

OTHER PUBLICATIONS ssk 100 Series Insertion Air/Gas Flow Sensor; By BRANDT; Advertisement; Date Unknown.
NZP1000 Series Nozzle Pilot Air/Gas Flow Sensor; By BRANDT; Advertisement; 1998.
Boost Venturi Probes; By United Sensor Corp.; Advertisement; Origination date unknown.
Differential pressures on a Pilot–Venturi and a Pilot–static nozzle over 360 degrees pitch and yaw R.M. Bear; NACA Report 264; pp. 223–229; 1928.
ASME Research Report on Fluid Meters; ASME Trans.; Volume Unknown; p.104; date unknown.

* cited by examiner

Primary Examiner—Edward Lefkowitz
Assistant Examiner—Corey D. Mack
(74) Attorney, Agent, or Firm—Harold A. Burdick

(57) ABSTRACT

Devices and methods for enabling measurement of a selected fluid characteristic in fluid flowing through a conduit. The device includes a body connected in the conduit having an accelerator section and a flow conditioner section within which a measuring unit such as an averaging pitot is maintained. The flow conditioner section includes a straight, substantially constant diameter conduit length selected to provide a settling distance after the accelerator section and in advance of the measuring unit sufficient to provide stabilization and linearization of the flowing fluid prior to measurement. Utilizing the device, repeatable and accurate measurement of the characteristic (flow rate for example) may be conducted over an operating range characterized by up to at least about a 25 to 1 turndown in flow with a constant flow coefficient independent of fluid flow velocity or Reynolds number.

29 Claims, 11 Drawing Sheets

| Pt. | P1 | P2 | % DIFFERENCE P1 VS P2 |
|---|---|---|---|
| 1 | 52.192 | 52.095 | 0.19 |
| 2 | 62.126 | 62.023 | 0.17 |
| 3 | 62.464 | 62.358 | 0.17 |
| 4 | 71.823 | 71.694 | 0.18 |
| 5 | 60.905 | 60.801 | 0.17 |
| 6 | 17.881 | 17.878 | 0.02 |
| 7 | 18.250 | 18.240 | 0.05 |
| 8 | 18.929 | 18.916 | 0.07 |
| 9 | 20.124 | 20.122 | 0.01 |
| 10 | 21.165 | 21.165 | 0.00 |
| 11 | 22.757 | 22.754 | 0.01 |
| 12 | 24.396 | 24.394 | 0.01 |
| 13 | 27.437 | 27.435 | 0.01 |
| 14 | 32.052 | 32.047 | 0.02 |
| 15 | 13.298 | 13.293 | 0.04 |
| 16 | 13.233 | 13.229 | 0.03 |
| 17 | 13.215 | 13.211 | 0.03 |
| 18 | 13.256 | 13.254 | 0.02 |
| 19 | 13.836 | 13.841 | -0.04 |
| 20 | 14.695 | 14.700 | -0.03 |
| 21 | 15.853 | 15.867 | -0.09 |
| 22 | 17.478 | 17.496 | -0.10 |
| 23 | 19.354 | 19.370 | -0.08 |
| 24 | 21.562 | 21.579 | -0.08 |
| 25 | 13.205 | 13.205 | 0.00 |
| 26 | 13.266 | 13.265 | 0.01 |
| 27 | 13.239 | 13.237 | 0.02 |
| 28 | 13.264 | 13.262 | 0.02 |
| 29 | 13.233 | 13.231 | 0.02 |
| 30 | 13.261 | 13.259 | 0.02 |
| 31 | 13.289 | 13.286 | 0.02 |
| 32 | 13.257 | 13.253 | 0.03 |
| 33 | 13.210 | 13.207 | 0.02 |
| 34 | 42.186 | 42.127 | 0.14 |
| 35 | 42.180 | 42.115 | 0.15 |
| 36 | 42.489 | 42.414 | 0.18 |
| 37 | 42.181 | 42.123 | 0.14 |
| 38 | 42.373 | 42.310 | 0.15 |

FIG. 5

DEVICE AND METHOD ENABLING FLUID CHARACTERISTIC MEASUREMENT UTILIZING FLUID ACCELERATION

FIELD OF THE INVENTION

This invention relates to flowing fluid measuring apparatus and methods, and, more particularly, relates to fluid flow accelerating and pressure measuring apparatus and methods.

BACKGROUND OF THE INVENTION

Various mass flow meters have been heretofore suggested and/or utilized that utilize fluid flow velocity acceleration with various measuring and sensing apparatus for measuring differential pressure (see U.S. Pat. Nos. 3,374,673, 3,774,645, 5,861,561, 6,247,495, 5,333,496, 1,550,124, and 790,888, for example). Such devices have heretofore only been provided for bypass type differential pressure meters and have not heretofore been suggested or utilized in combination with averaging pitot type differential pressure measurement probes (such as those illustrated in U.S. Pat. Nos. 5,036,711 and 6,321,166).

To be optimally useful, flow meters should be effective for a wide range of fluids (gas, liquid and vapor) and flow velocities. The velocity of the fluid and the operating range are determined by the users process requirements. Often the required turndown and accuracy exceeds the specifications of most all flow meters. This is common, for example, in systems providing fuel to boilers that require low flow rates in the summer and very high flow rates in the winter. Often expensive bypass piping and multiple flow meters of different operating ranges are required. In other applications there is insufficient fluid velocity available to generate the required turndown or to accurately measure the output signal.

Heretofore known flow measuring apparatus, both those including as well as those not including acceleration, have typically had a limited operational range (in the area of a 6 to 1 turndown in flow) and have required long lengths of straight run conduit in advance of measurements. In the case of known systems utilizing venturi type fluid flow velocity acceleration, the flow-measuring instruments associated with the venturi have often been positioned at the mouth or very near the mouth thereof leading to flow measurements that have greater than desirable error due at least in part to the fact that flow coefficients vary with flow velocity and/or Reynolds number. Devices and methods that improve on both heretofore known measurement accuracy and utility (turndown rate) would be desirable.

Moreover, while various heretofore known flow meters have provided measuring instrument insertion and retraction capability while retaining pressure, and while separate upstream flow straighteners in a pipe to condition flow are known, there has not been a device or apparatus suggested heretofore that includes simultaneous conditioning of the fluid velocity profile with pressure sensing in the conditioned area of the flow stream. Heretofore known flow meters require a long, straight lengths of upstream conduit, and are thus dependent on the upstream piping configuration of the system, to stabilize and rectify the velocity profile. A device improving such deficiencies, particularly for use with averaging pitot type probes, and which could include integral insertion/retraction capability, could be utilized.

SUMMARY OF THE INVENTION

This invention provides devices and methods for enabling fluid characteristic measurement using fluid acceleration. The devices and methods provide for greatly enhanced accuracy and utility (turndown). The device includes a fluid flow accelerator and conditioner providing a settling distance in advance of characteristic measurement whereby the fluid is accelerated (in most applications, over 2 times pipe line velocity), stabilized, and the velocity profile of which is linearized. The device is highly accurate (to about 1.0%) and repeatable (to about 0.1%), requires no calibration, has a turndown up to and exceeding about 50 to 1, and has a low signal to noise ratio. The device requires very little straight pipe run in advance of the device for accurate readings (reducing heretofore known straight run requirements by up to 80%) and may be deployed with very low pressure loss. The device is particularly useful in applications that do not provide sufficient fluid velocity to produce a readable signal.

The flow accelerator and conditioner of the device of this invention is connectable in the conduit carrying fluids of concern and has a converging inlet for accelerating flow of the fluid through the device by restricting flow from the conduit. A linear section having a substantially constant cross section extending downstream from the inlet has an opening thereat spaced from the inlet a sufficient distance selected to allow stabilization and linearization of flow of the fluid before passage in the linear section by the opening. A measuring instrument has a portion maintained through the opening and extending into the linear section of the flow accelerator and conditioner.

The measuring unit preferably includes a single tap fluid flow measuring unit (such as an averaging pitot), performance of which is greatly enhanced by the device of this invention. The cross section of the linear conduit section has a substantially constant diameter smaller than diameter of the conduit. First and second selected restrictions of fluid flow are established at the converging inlet and at the linear section around the measuring unit when installed, dimensions of the inlet and constant diameter of the linear section selected so that the flow restrictions are balanced thereby contributing to conditioning of fluid flow and enhancement of measurement accuracy while still allowing for adequate throughflow. Means are provided for receiving and securing the portion of the measuring instrument adjacent to the opening at the linear conduit section.

The device of this invention is preferably utilized for enabling flowing fluid pressure measurements in a conduit. The flow conditioner section of the device is associated at one end with a lesser diameter of the accelerator section of the device and has an outlet end. The linear length upstream from the opening is selected so that internal energy, static pressure and velocity vectors of the fluid can stabilize and linearize after fluid passage through the accelerator section and in advance of the opening. The measuring unit has ports locatable in the fluid flowing through the flow conditioner section for measuring pressure thereat, the portion within the flow conditioning means presenting a blockage area. The lesser diameter, the linear length between the lesser diameter and the opening, and the blockage area are selected so that an operating range of the device having up to at least about a 25 to 1 turndown in flow capability with a constant flow coefficient independent of fluid flow velocity or Reynolds number is achieved.

The steps in the methods of this invention include increasing the velocity of fluid flowing through a conduit and thereafter conditioning flow of fluid so that internal energy, static pressure and velocity vectors of the fluid stabilize and linearize. Sensing is done in the velocity increased and flow conditioned fluid flow to enable measurement of the characteristic of interest, measuring of the characteristic being accomplished over an operating range characterized by up to at least about a 25 to 1 turndown in flow with a constant flow coefficient independent of fluid flow velocity or Reynolds number.

It is therefore an object of this invention to provide devices and methods for enabling fluid characteristic measurement using fluid acceleration.

It is another object of this invention to provide devices and methods for fluid characteristic measurement using fluid acceleration that provide for greatly enhanced accuracy and utility (turndown).

It is another object of this invention to provide a device for fluid characteristic measurement including a fluid flow accelerator and conditioner whereby the fluid is accelerated and stabilized, and the velocity profile of which is linearized in advance of measurement.

It is still another object of this invention to provide a device for fluid characteristic measurement that is highly accurate and repeatable, requires no calibration, has a turndown up to and exceeding about 25 to 1, and has a low signal to noise ratio.

It is yet another object of this invention to provide a device and method for measuring selected fluid flow characteristics in a conduit that can produce a substantially constant flow coefficient that is substantially flow velocity and Reynolds number independent.

It is still another object of this invention to provide a device and method enabling flowing fluid pressure sensing in a conduit that includes simultaneous conditioning of the fluid velocity profile with pressure sensing in the conditioned area of the flow stream.

It is yet another object of this invention to provide a device enabling flowing fluid characteristic measurement in a conduit that includes means for simultaneous acceleration and conditioning of the fluid velocity profile with pressure sensing in the conditioned area utilizing an averaging pitot type probe.

It is another object of this invention to provide a device enabling flowing fluid characteristic measurement in a conduit that includes a flow accelerator and conditioner connectable in the conduit and having a converging inlet for accelerating flow of the fluid through the device and a linear section having a substantially constant cross section extending downstream from the inlet, the linear section having an opening thereat spaced from the inlet a sufficient distance selected to allow stabilization and linearization of flow of the fluid before passage in the linear section by the opening, and a measuring instrument having a portion maintained through the opening and extending into the linear section of the flow accelerator and conditioner for taking fluid characteristic measurements thereat.

It is still another object of this invention to provide a device for enhancing performance of a single tap fluid flow measuring unit postionable in a conduit that includes a convergent section providing a first selected restriction of fluid flow, and a constant diameter linear conduit section extending downstream from the convergent section with an opening thereinto for receipt of the measuring unit, the constant diameter selected to provide a second selected restriction of flow at the measuring unit, the selected flow restrictions being balanced.

It is still another object of this invention to provide a device enabling flowing fluid pressure measurements in a conduit having a diameter including accelerator means at the conduit for increasing fluid flow velocity by cross sectional area restriction to a lesser diameter, flow conditioning means for conditioning flow of the fluid and associated at one end with the lesser diameter of the accelerator means and having an outlet end, the flow conditioning means having an opening between the ends with a linear length upstream of the opening selected so that internal energy, static pressure and velocity vectors of the fluid can stabilize and linearize after fluid passage through the accelerator means and in advance of the opening, and pressure measuring means having a portion through the opening at the flow conditioning means with ports locatable in the fluid flowing through the flow conditioning means for measuring pressure thereat, the portion within the flow conditioning means presenting a blockage area, the lesser diameter, the length and the blockage area selected so that an operating range of the device having up to at least about a 25 to 1 turndown in flow with a constant flow coefficient independent of fluid flow velocity or Reynolds number is achieved.

It is yet another object of this invention to provide a method for enabling characteristic measurement of fluid flowing at a velocity in a conduit that includes the steps of increasing the velocity, conditioning flow of fluid so that internal energy, static pressure and velocity vectors of the fluid stabilize and linearize after increasing the velocity, sensing in the velocity increased and flow conditioned fluid flow to enable measurement of the characteristic, and measuring the characteristic over an operating range characterized by up to at least about a 25 to 1 turndown in flow with a constant flow coefficient independent of fluid flow velocity or Reynolds number.

With these and other objects in view, which will become apparent to one skilled in the art as the description proceeds, this invention resides in the novel construction, combination, and arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 5 is a is chart comparing upstream static pressure and high pressure reading at the device of this invention;

DESCRIPTION OF THE INVENTION

Figure 1:
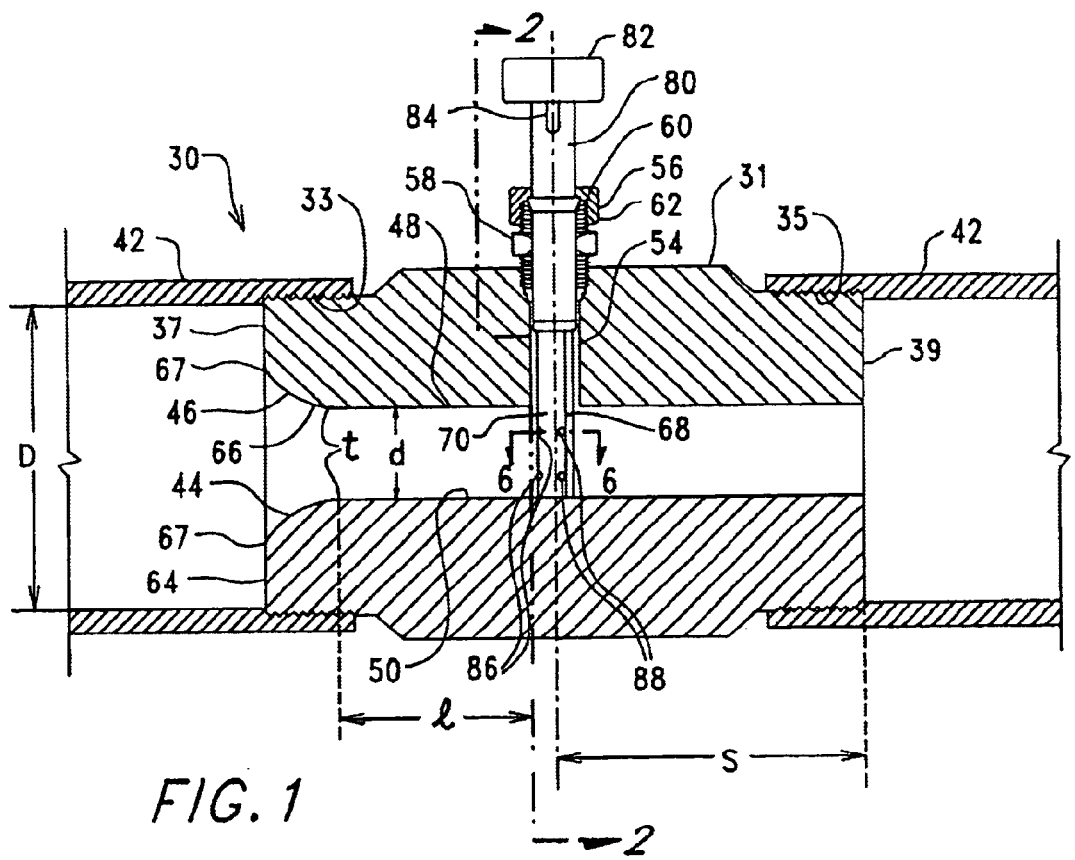
FIG. 1 is a partial sectional illustration of the device of this invention.

A first embodiment of device 30 of this invention is shown in FIGS. 1, 2 and 6 through 10. FIG. 1 shows device 30, including a threaded flow accelerating and conditioning meter body 31, mounted at mounting surfaces 33 and 35 at opposite meter body ends (inlet end 37 and outlet end 39) of meter body 31 intermediate a length of threaded pipe or conduit 42 (adaptation for other mountings could of course be utilized as discussed hereinafter). Meter body 31 includes accelerator section 44 having convergent inlet 46 thereat, a flow restricting feature that funnels fluid into integral flow conditioner section 48, including linear (or straight), substantially constant cross-section conduit section 50 having a circular diameter (d) and a predetermined length.

As discussed hereinbelow, dimensions of linear section 50 are selected to provide a settling distance in which the accelerated fluid is stabilized and the velocity profile linearized prior to measurement. Located at a selected location a predetermined distance (or length) (l) from tangent (t) of convergent inlet 46, opening 54 is established through meter body 31, entering conditioner section 48 at substantially a right angle. Opening 54 receives threaded compression fitting 56 including body 58, ferrule (or compression ring) 60 and nut 62. Distance (l) is selected to be sufficient to allow stabilization and linearization of flow of the fluid before passage in the linear section by opening 54, as discussed below. Distance (l) is preferably equal to about one-eighth of a diameter (d) to seven diameters (d) of linear conduit section 50, depending on implementation. For example, with smaller diameters (d) (up to two inches approximately) approximately one diameter (d) is typically sufficient, while medium and larger diameters (d) require less but in any case at least about two inches.

Convergent inlet 46 is a predetermined quadrant of a circular or elliptical radius defined between wall face 64 and inner surface 66 of accelerator section 44 (wall face 64 preferably providing an abrupt discontinuity 67 at conduit 42, with face 64 at a nearly 90° angle to the fluid flow in conduit 42, thereby producing a disrupted surface that strips off any boundary layer (i.e., maintains a turbulent boundary layer) and lowers the drag created by the pipe wall thereat enabling a more accurate measurement; other means, such as a roughened surface thereat, could be utilized to accomplish the same goal). Convergent inlet 46 preferably defines a uniform reduction in the diameter (D) of conduit 42 to diameter (d) at linear conduit section 50 of conditioner section 48, thereby to accelerate flow at section 48 (preferably in excess of about two times fluid velocity in conduit 42). While not preferred, other uniform reduction inlet configurations, such as cone or bell shapes, or venturi type, could be used though perhaps not as efficiently deployed.

Averaging pitot 68 has a tube portion 70 that extends through opening 54 into conditioner section 48 of meter body 31 and is affixed to body 31 by compression fitting 56. Insertion/retraction capability of pitot 68 utilizing known modifications at opening 54 may be provided (as shown hereinafter). Predetermined straight, substantially constant diameter, length (s), preferably equal to about one-eighth to three diameters (d) of linear conduit section 50, is preferably provided downstream of opening 54 and pitot 68 to maintain the same velocity profile before and after the measurement point at pitot 68 (with about the same variation between small and larger conduit diameters (d) as discussed hereinabove with regard to distance (l) being applicable to length (s)). While not shown, a diffuser section (a cone shaped diffuser, for example) may be located at conditioner section 48 after predetermined length (s) downstream from averaging pitot 68 to gradually increase the diameter of linear conduit section 50 prior to exiting meter body 31 (to reduce the permanent pressure loss).

Averaging pitot 68 as described hereinafter is a single tap sensing/measuring unit (as distinguished from plural tap instruments, typically flow diverting instruments or instruments requiring a separate upstream pressure tap for dynamic compensation of gas density) for sensing pressures at high pressure and low pressure ports of the unit when placed in the main flow channel at conditioner section 48 of body 31. As used herein, pitot 68 is a portion of an overall instrument for gathering pressure readings in addition to gathering differential pressure to determine flow rate.

Tube 70 of averaging pitot 68 is a bullet shaped, dual chambered sensor tube (as known in the art) that extends through cover tube 80 and is affixed to instrument head 82 and gusset 84. A plurality of upstream facing high pressure ports 86 (see FIG. 6) senses the impact (or high) pressure. In a like manner, low pressure is sensed by a plurality of lateral low pressure ports 88 located on both sides of sensor tube 70. The high and low-pressure ports are located at a predetermined distance from the wall of conduit section 50.

Figure 2:
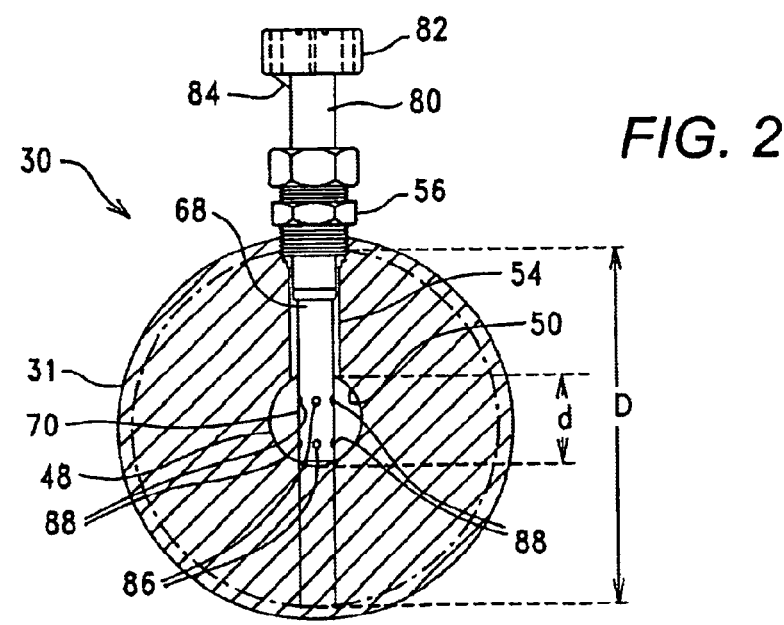
FIG. 2 is a partial sectional illustration taken through section lines 2—2 of FIG. 1.

FIG. 2 best illustrates the critical blockage or beta ratios of conduit 42 internal diameter (D) to the straight lesser internal diameter (d) of conduit section 50, and the ratio of the internal area (a) defined at (d) to the area blocked in conduit section 50 by averaging pitot 68 (c×d). These ratios combined with functions of the radius of convergent inlet 46, overall length of the meter body 31 between ends 37 and 39 (FIG. 1), location of averaging pitot 68 and other factors determine the meters accuracy and utility in terms of its operating range or turndown (maximum flow rate/minimum flow rate).

Optimal function of device 30 relies in part on proper relation of the relative blockage of averaging pitot 68 in conduit section 50 to the blockage by converging inlet 46 of upstream conduit 42. Each blockage causes the fluid to accelerate. The upper flow rate limit at which a system may operate is established when fluid velocity at the smallest passage reaches sonic velocity (a condition also known as choked flow). By selecting the blockage ratios herein, the maximum obtainable flow rate can be measured while still linearizing and conditioning the flow profile over the widest possible range. The device of this invention provides a dual blockage effect, maintaining selected ratios between conduit 42 and conduit section 50 (the throat blockage), and between conduit section 50 and the reduced area where the fluid can travel past averaging pitot 68 (the averaging pitot defined blockage).

Without sufficient area reduction from conduit 42 to conduit section 50 the velocity profile of the flowing fluid will not be sufficiently conditioned and flow measurement by averaging pitot 68 will thus be compromised. If there is not enough blockage by averaging pitot 68 at conduit section 50 the location of the shock front (when the meter is running in a choked condition) will encroach upon low pressure sensing ports 88 of averaging pitot 68. This would be detrimental because unstable pressure fluctuations occur in the shock front of sonic flow. If the blockage at conduit 42 by conduit section 50 or at the reduced area of conduit section 50 where fluid can travel past averaging pitot 68 is too great, device 30 has a drastically limited flow range.

The configuration of device 30, providing a balanced dual blockage effect with throat blockage and averaging pitot blockage that allows for adequate throughflow, contributes to proper conditioning of the flow and enhances proper pitot 68 functioning, especially insuring that the shock front in choked flow situations will not encroach on low pressure ports 88 of averaging pitot 68. This configuration is especially useful where low-pressure sensing ports 88 of averaging pitot 68 are on the side of the averaging pitot instead of the rear, as shown herein.

Figure 3:
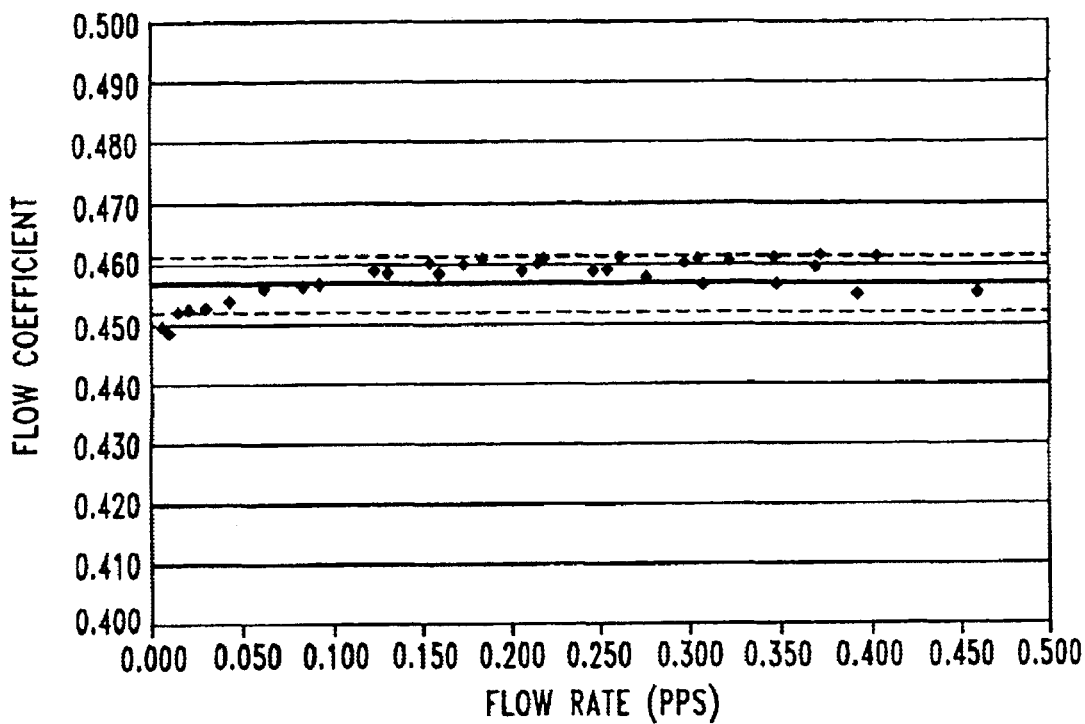
FIG. 3 is a graph illustrating performance of the device of this invention.

Unique to this device is that the ratio of D/d, the overall length of meter body 31 between ends 37 and 39 and averaging pitot 68 percent blockage of internal diameter (d) of conduit section 50 are selected to accelerate the velocity of the fluid thus extending the device 30 operating range and accuracy. The ratio of area defined by $(a-(c \times d))/a$ is used to determine the flow coefficient of averaging pitot 68. These ratios and other factors are used in the calculations to determine the flow meters accuracy and operating range. FIG. 3 shows the result of tests to determine the operating range (turndown) for a specific application (in a meter body 31 with d=1.35", the solid line representing average flow coefficient, the dotted lines showing a plus and minus 1% envelope, and the diamonds locating data points). The data verifies a better than 25 to 1 turndown in flow and a constant flow coefficient (the true flow rate divided by the theoretical flow rate) independent of velocity or Reynolds Number (typically exceeding 50 to 1, herein about 65 to 1, 0.00705PPS to 0.4594PPS, and with some later testing showing results in the vicinity of 100 to 1 turndown). As used herein, turndown is defined as the highest measurable flow rate at which the device is accurate to within about ±1% divided by the lowest measurable flow rate at which the device is accurate to within about ±1%.

Figure 4:
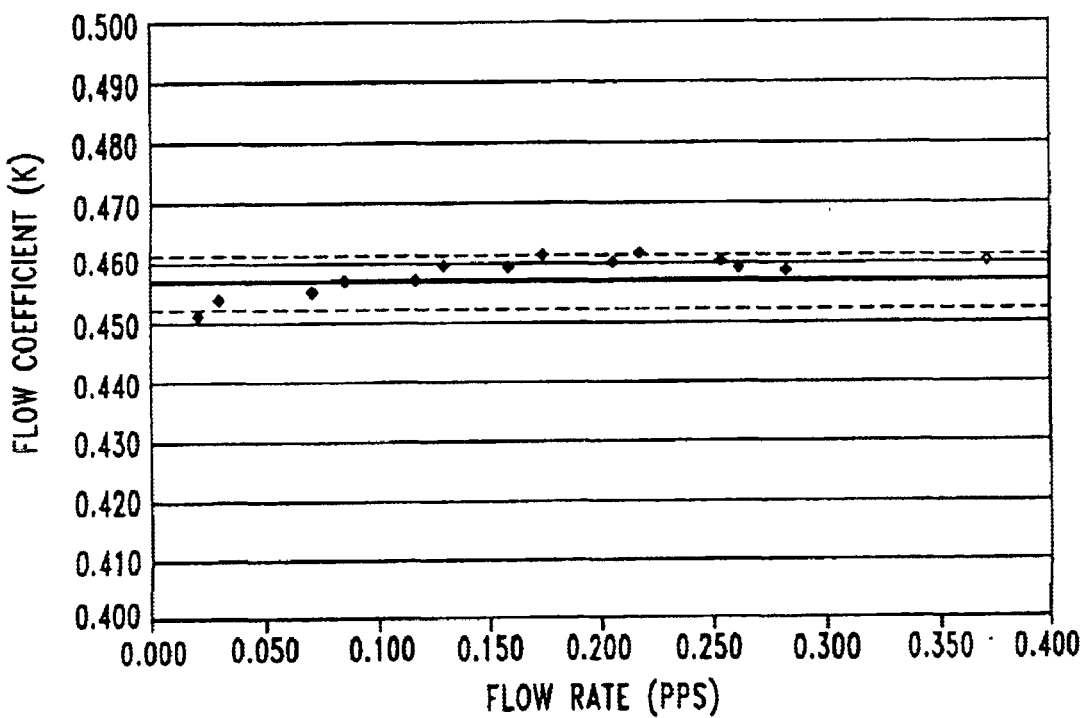
FIG. 4 is another graph illustrating performance of the device of this invention.

A particularly advantageous feature of device 30 is that the distance (l) of flow conditioner section 48 of meter body 31 stabilizes and rectifies distorted, asymmetrical profiles (as discussed hereinafter). This permits device 30 to accurately measure over an extended turndown when positioned in close proximity to upstream disturbances such as elbows, valves, tees, and the like in conduit 42. FIG. 4 shows results of tests (utilizing similar test conditions as reported in FIG. 3) reporting the accuracy of device 30 at measuring flow rate with an extremely short straight run of conduit 42 upstream of device 30. The data verifies that device 30 accurately measures flow rate with less than two conduit 42 diameters (one being found sufficient in many applications) of straight run upstream of device 30.

Regarding flow conditioner section 48 of device 30, when a flow stream is converged rapidly the fluid molecules accelerate and their kinetic energy increases. As a result of this increase in kinetic energy the internal energy of the fluid decreases which is realized by a decrease in static pressure. This is consistent with Bernoulli's Equation and the first law of thermodynamics. When measuring static pressure as a means of flow measurement, an adiabatic (no heat loss or gain) and isentropic (no friction loss) process is assumed as the fluid accelerates into the throat of the device. This assumption breaks down when a rapid acceleration occurs (especially in small diameter throats and with fluid molecules susceptible to varying vibrational energy states, for example gases such as carbon dioxide and steam, or liquids such as water). This causes a deviation from the Bernoulli's equation and is realized by an error in the flow coefficient in the flow-measuring device.

To allow for a normalization of the vibrational energy of the fluid molecules, device 30 provides a straight run distance (l) at conduit section 50 (as discussed, preferably about one-eighth to seven pipe diameters (d)) from the point of minimum convergence at inlet 46. This settling length allows the fluid molecules to normalize to their previous vibrational state (and flow vectors to rationalize), thereby causing the static pressure to be representative of the true internal energy of the fluid flowing in past the device and allowing a more accurate flow measurement.

Heretofore, equipment design has often proceeded assuming that the energy states of the fluid molecules are at equilibrium as the fluid is accelerated. However, in small throat diameters (as are commonly present in applications of interest herein) the transition distance over which rapid acceleration takes place can be very small. When this small linear distance is coupled with a high fluid velocity in the throat (often near mach one), the time over which the transition occurs is extremely small. For example, for a transition distance of 0.25 centimeters and a fluid velocity of mach 0.95 in the throat at atmospheric pressure and at an ambient temperature of 60° F. (throat velocity approximately equal to 250 m/sec or 25,000 cm/sec) the fluid molecules pass through the transition region in 0.00001 seconds (10 microseconds).

Because of the extremely short time required for the fluid molecules to traverse such a transition distance, the vibrational energy state of the fluid molecules at the transition is not at equilibrium, contrary to the common assumption. This phenomenon has been experimentally observed (wherein discharge coefficients were observed to be higher than predicted for small-throated circular inlet sonic nozzles when running carbon dioxide gas). Due to the short transition time, the internal energy (measured as the pressure of the fluid) is temporally at an increased vibrational energy state at and immediately after the transition, and pressure thereat will be lower than predicted because a portion of the internal energy is converted into this additional vibrational energy.

The use in device 30 of this invention of an extended overall throat length (measured from tangent point (t) of convergent inlet 46 to outlet end 39) in conjunction with pressure sensing a selected distance (l) downstream of tangent point (t) substantially eliminates the non-equilibrium vibrational energy states of the fluid molecules traveling through this device at the point of measurement at averaging pitot 68. In particular, the distance (l) between tangent point (t) and averaging pitot 68 allows the vibrational energy of the fluid molecules to reach equilibrium and sensing of the pressure is thus more representative of the actual internal energy of the fluid.

The configuration of device 30 of this invention also compensates for change in static pressure as the fluid is accelerated in convergent inlet 46 (whereby a separate upstream pressure tap is made unnecessary for dynamic compensation of the gas density). Tests comparing the dynamic pressure measured by upstream ports 86 of averaging pitot 68 in conduit section 50 of flow conditioner section 48 to an upstream pressure test tap at conduit 42 show close agreement (accurate to within 0.2% or less of each other) in the two pressures (see FIG. 5 wherein P1 reports upstream pressure test tap measurements and P2 reports pressure measured by upstream ports 86 of averaging pitot 68).

The production of a pressure at point of measurement in device 30 which is nearly identical to the upstream static pressure in conduit 42 is accomplished by the combination of elements including convergent inlet 46, extended throat length of conduit section 50 and upstream dynamic pressure sensing ports 86 of averaging pitot 68. The agreement of these two pressures affords improved accuracy of the measurement of the flow rate of fluid when calculating the density of the fluid as it passes through device 30.

For example, because the density of the fluid for gas measurement is directly proportional to the absolute pressure of the gas, and for differential pressure devices such as averaging pitot 68, the flow rate determined is influenced by the square-root of the density of the gas, the improved accuracy of the pressure measurement yields an improvement in the flow rate measurement accuracy in a square-root manner. Using the partial derivative of the flow rate with respect to the gas pressure as it influences the gas density times the uncertainty of the pressure measurement, one can determine the net improved accuracy in the flow rate with regard to the improved accuracy of the pressure measurement. In square root devices such as the differential pressure producing averaging pitot tube 68 utilized in the preferred embodiment of this invention, the partial derivative of the flow rate with respect to the gas pressure produces a 0.5 multiplier to the uncertainty of the pressure as its influence on the accuracy of the flow rate. Hence a 10% error in the pressure measurement produces a 5% error in the flow rate measured when using such differential pressure devices. By substantially reducing the error in the pressure measurement, the accuracy in the flow rate measurement is thus significantly improved.

Beyond the stabilization of the molecular vibration states described above, the configuration of conduit section 50 relative to inlet 46 corrects a problem of unstable static pressures experience heretofore. At high gas velocities at tangent point (t) where the convergent inlet 46 of accelerator section 44 merges with conduit section 50 of flow conditioner section 48, localized fluid velocities exceed the speed of sound and are considered super-sonic. As noted, this phenomenon produces unstable static pressures which cause errors in devices that use pressure to determine flow rates (i.e. differential pressure devices such averaging pitot tubes). Device 30 avoids this problem by locating the pressure sensing components (pitot tube 68) a selected distance (l) from tangent point (t). The unstable regions at and near downstream from tangent point (t) are specifically avoided as a locus of measurement.

In addition to avoiding unstable fluid velocities that could even be supersonic (at high upstream pipe velocities) at or near tangent point (t) of convergent inlet 46, having distance (l) from the tangent point provides additional conditioning of the fluid velocity profile. Non-coaxial fluid velocity vectors are realigned over distance (l) in conduit section 50 by the viscous effects of the fluid.

If two neighboring layers of fluids are traveling at different velocities and in different directions, they will tend to influence each other. The slower fluid layer will tend to travel faster, and the faster fluid layer will tend to travel slower by the influence of the adjacent fluid layers. Since the principle direction of the fluid vectors are coaxial, non-coaxial fluid vectors will be realigned coaxially. Thus, the longer distance (l) at conduit section 50 allows more influence by coaxial velocity fluid layers on non-coaxial velocity fluid layers before measurement (non-coaxial velocity vectors can significantly compromise the precision of measurements at averaging pitot 68). Since the more viscous the fluid the more pronounced will be the effect of the extended throat length in correcting the non-coaxial fluid velocity vectors, device 30 has a significant advantage as well for flow measurements of more viscous fluids (for example water).

Figure 6:
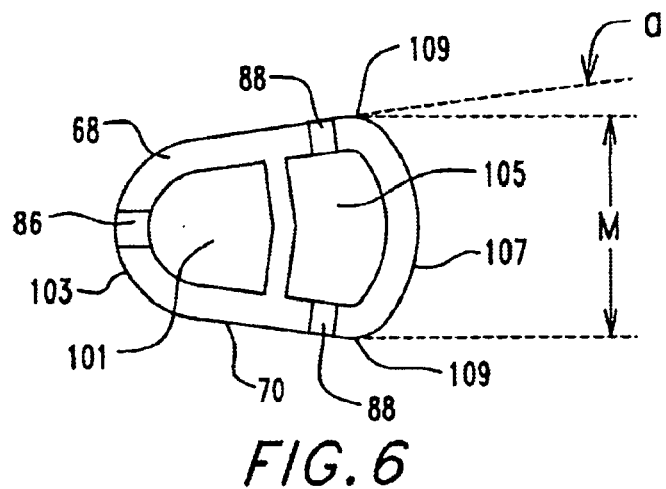
FIG. 6 is a sectional illustration taken through section lines 6—6 of FIG. 1.

FIG. 6 is a section taken through averaging pitot tube 70. As noted, tube 70 is bullet shaped (having a slightly divergent angle (a) of approximately eight degrees). High-pressure chamber 101 communicates through the plurality of high-pressure ports 86 located at the upstream facing front surface 103 of tube 70. Low pressure chamber 105 is located at rear portion 107 of tube 70 and communicates through the plurality of low-pressure ports 88 positioned on each side of tube 70 forward of maximum width (m) of tube 70 at rear wall portion 107 and fluid separation points 109 where vortices are shed. Front surface 103 is roughened to maintain a thin turbulent boundary layer to reduce the lift, drag and vortex shedding forces and produce a constant and accurate flow coefficient.

Figure 7:
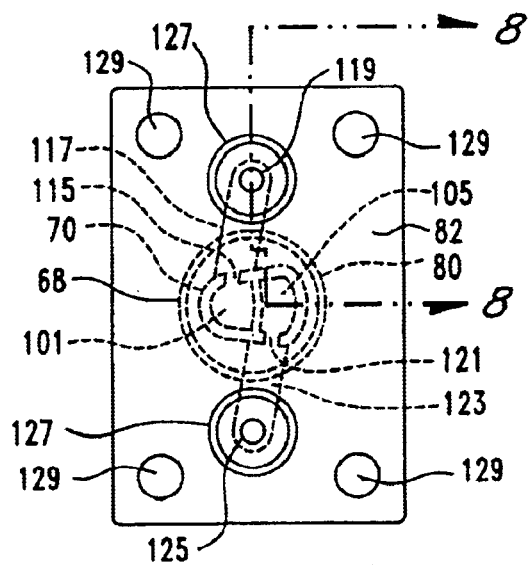
FIG. 7 is a partial top view of the instrument head of the device of this invention.
Figure 8:
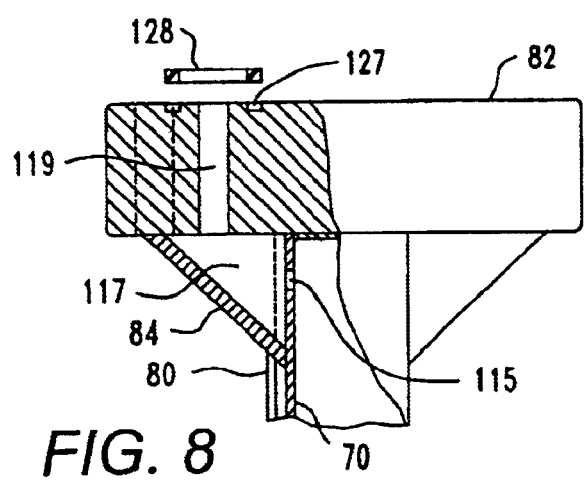
FIG. 8 is a partial exploded sectional illustration taken, in part, through section lines 8—8 of FIG. 7.

Averaging pitot instrument head 82 is of commonly utilized design (FIGS. 7 and 8). High pressure is communicated from chamber 101 of tube 70 of averaging pitot 68 through hole 115 to passage 117 at gusset 84 (see FIG. 1) affixed to tube 70 and instrument head 82 forming a pressure tight chamber. High pressure is further communicated through hole 119 that passes through the instrument head 82. In a like manner, low pressure is communicated through hole 121 from low pressure chamber 105 to passage 123 at gusset 84 and through hole 125 passing through instrument head 82. Circular grooves 127 receive gaskets 128, and clearance holes 129 are provided for securement of instruments utilizing bolts. Cover tube 80 is affixed to gusset 84 and instrument head 82 to contain the static pressure within meter body 31 and provide a round surface for engagement by compression fitting 56.

Figure 10:
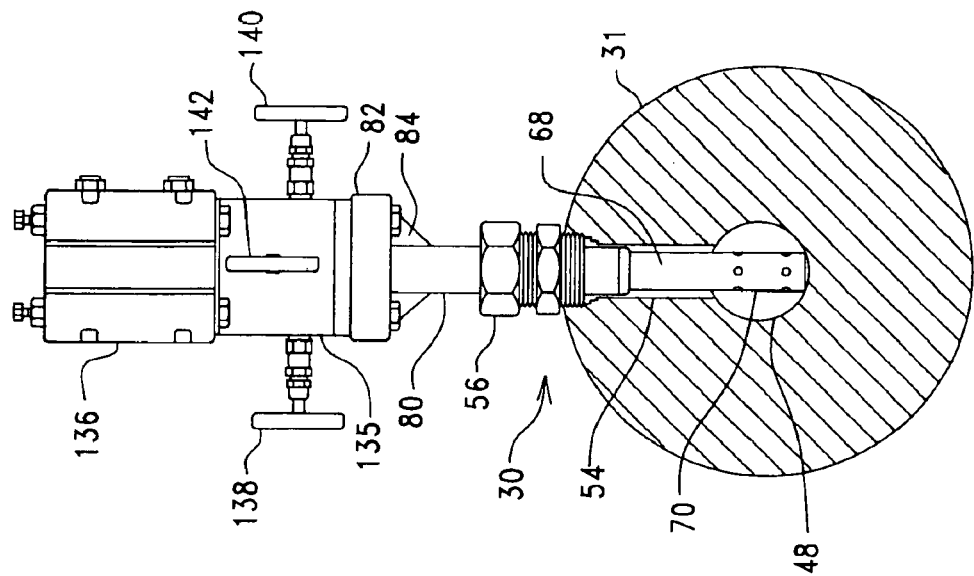
FIG. 10 is a partial sectional illustration taken through section lines 10—10 of FIG. 9.
Figure 9:
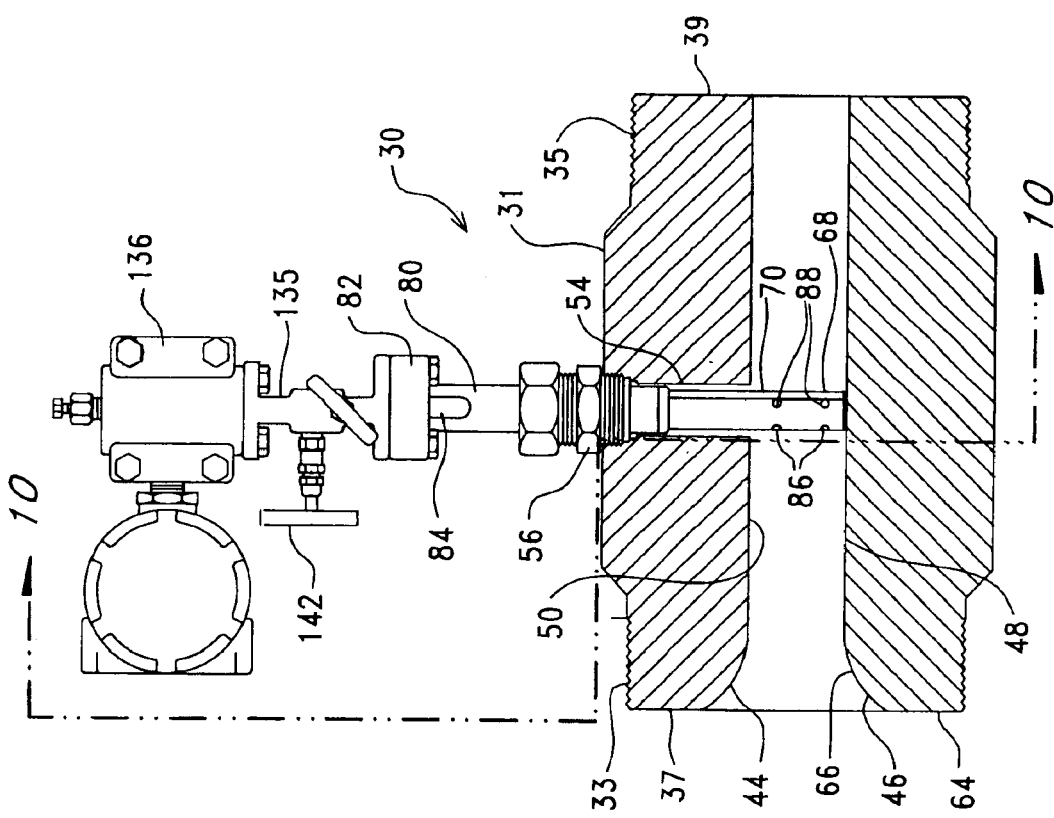
FIG. 9 is another partial sectional illustration of the device of this invention.

FIGS. 9 and 10 illustrate one method of connecting a standard, commercially available, instrument valve manifold 135 and single differential pressure transmitter (transducer) 136 to flow sensing averaging pitot 68 at instrument head 82 thereof. Manifold 135 is bolted to instrument head 82 compressing high and low pressure gaskets 128 (shown in FIG. 8) thus forming pressure tight seals thereat. In a like manner, transmitter 136 is bolted to manifold 135. Other methods of connecting are frequently used such as remotely mounting the manifold and transmitter. Tubing and fittings are used to communicate the high and low pressures to manifold 135 and transmitter 136 as are well known in the art.

Manifold 135 includes high-pressure shut-off valve 138, low-pressure shut-off valve 140 and equalizer valve 142 that when opened permits the high and low pressures to mix thereby reducing the differential pressure (high pressure-low pressure) to zero. Manifold 135 functions to isolate the process fluid from transmitter 136 for transmitter repair or replacement and to verify or change transmitter calibration. Differential pressure transmitter 136 converts the high and low pressure signals received from averaging pitot 68 and transmits an electrical analog or digital output signal to a flow computer or control system which calculates the flow rate (use of the device of this invention could be employed to gather other data as may be apparent).

Figure 11:
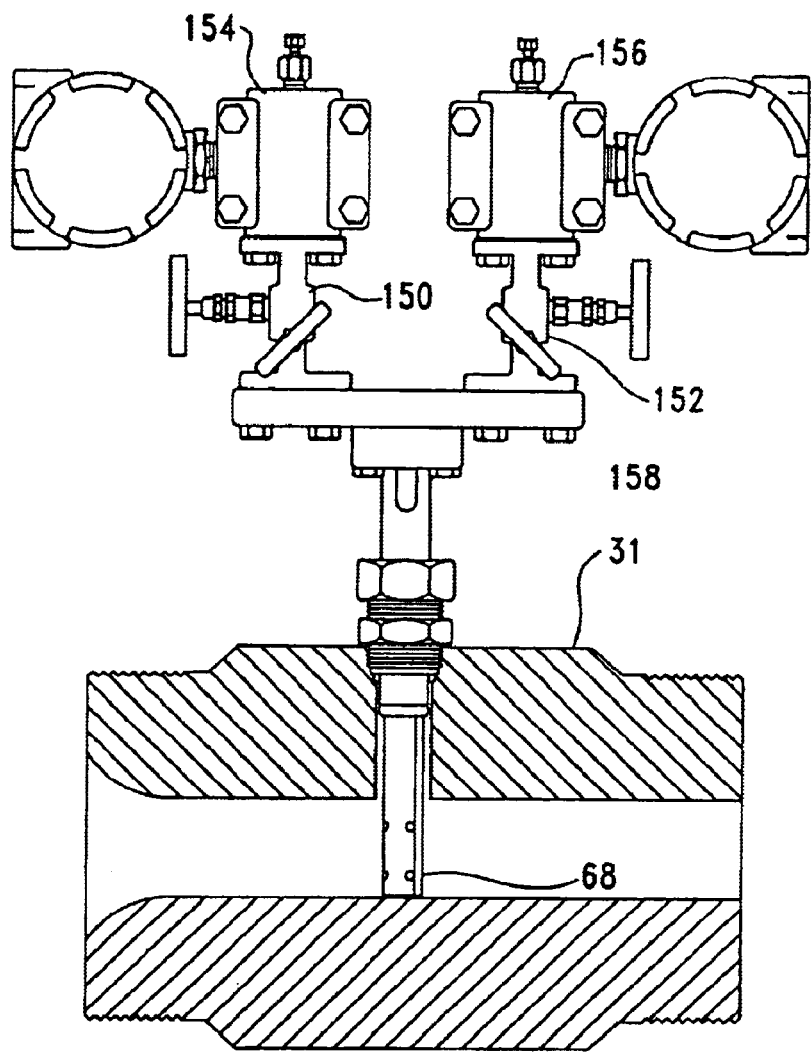
FIG. 11 is a partial sectional illustration of another embodiment of the device of this invention.
Figure 12:
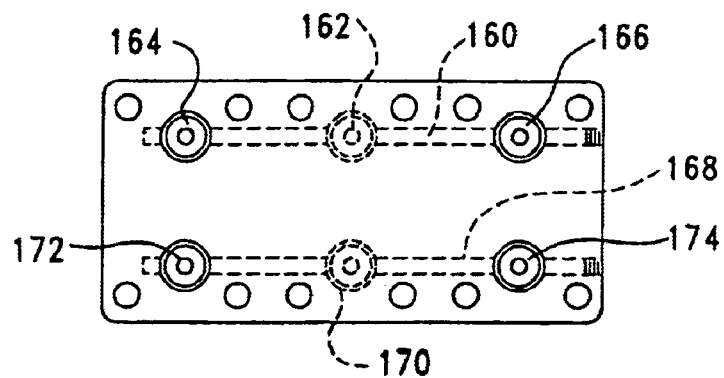
FIG. 12 is a partial top view of the instrument head of the device of FIG. 11.

FIGS. 11 and 12 illustrate another embodiment of associating meter body 31 and averaging pitot 68 with output instrumentation including two standard, commercially available, instrument valve manifolds 150 and 152 and differential pressure transmitters 154 and 156. Plate 158 is bolted to averaging pitot instrument head 82, with gasketing similar to those previously described used to seal the high and low pressures at the interfaces of plate 158 with head 82 and manifolds 150 and 152.

Plate 158 includes passage 160 formed therein permitting high-pressure to communicate through opening 162 (from hole 119 at head 82; FIG. 7) with the respective high pressures of the two manifolds 150 and 152 and transmitters 154 and 156 through openings 164 and 166, respectively. Passage 168 communicates the low pressure through opening 170 (from hole 125 at head 82; FIG. 7) to manifolds 150 and 152 and transmitters 154 and 156 through openings 172 and 174, respectively.

The use of two transmitters extends the operating range, often expressed as turndown. A single transmitter is capable of accurately reading a flow turndown of 6:1 (example: maximum flow 120 GPM–minimum flow 20 GPM). The second transmitter is added to extend the operating range (turndown) to 36:1 (6 to the second power). This turndown can be extended even further, to over 100:1 with only a slight loss of accuracy.

Close agreement of upstream static pressure in conduit 42 and dynamic pressure being measured by upstream ports 86 of averaging pitot 68 as discussed above allows, alternatively, the use of a multivariable transmitter with a higher degree of accuracy (since pressure being sensed by the transmitter is nearly identical to the upstream static pressure prior to the convergent inlet 46). A substantial economic and maintenance advantage is realized by not having to penetrate conduit 42 upstream of meter body 31. An additional penetration requires additional hardware and fittings to bring the static pressure back to a multivariable transmitter. Furthermore, current multivariable transmitters cannot accept a static pressure input that is separate from the upstream pressure and downstream pressure taken from any single tap differential pressure measuring instrument such as averaging pitot 68.

Figure 14:
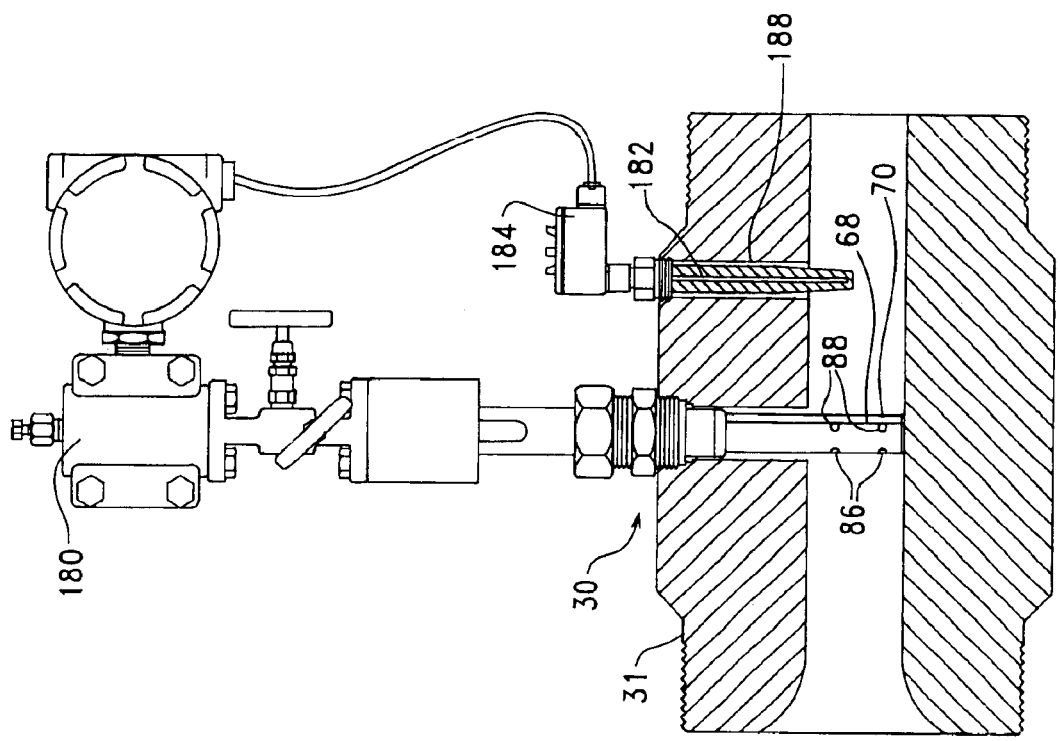
FIG. 14 is a partial sectional illustration of yet another embodiment of the device of this invention.
Figure 13:
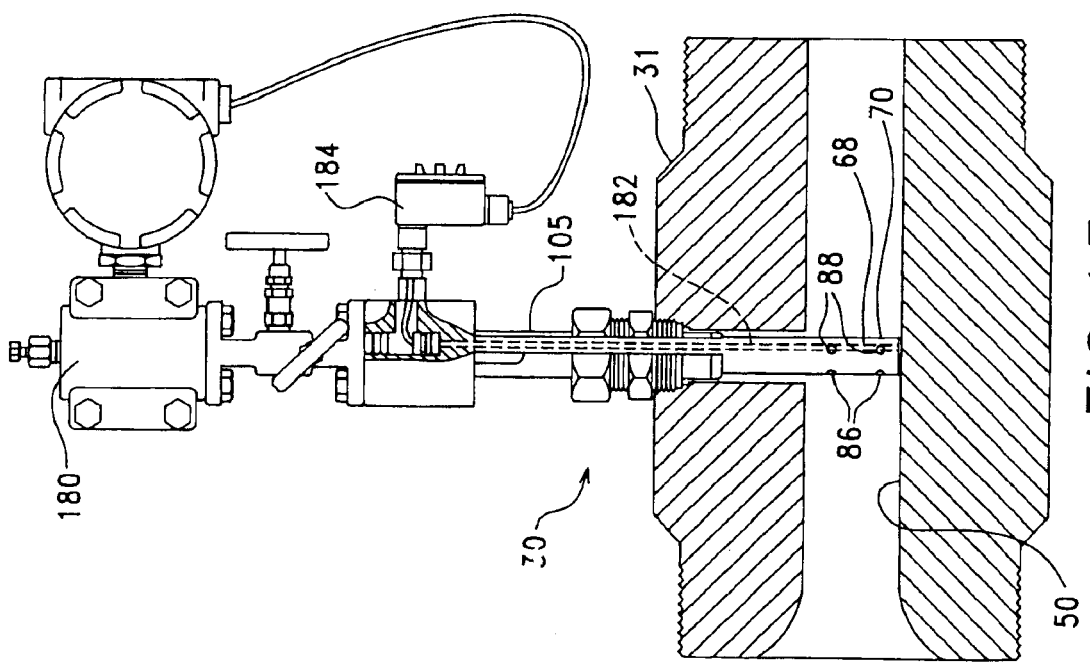
FIG. 13 is a partial sectional illustration of still another embodiment of the device of this invention.

FIGS. 13 and 14 show the use of multivariable transmitter 180 that outputs a pressure, temperature and compensated flow signal used in combination with device 30 of this invention. Transmitter 180 senses the static pressure from high pressure ports 86 of pitot 68. A separate input to the transmitter from RTD (resistance type device) 182 provides the temperature measurement. FIG. 13 shows an averaging pitot 68 with an integral RTD 182 and junction box 184, RTD 182 positioned within low pressure chamber 105 of pitot tube 70 and extending into conduit section 50 of the meter body 31. FIG. 14 shows a separate thermowell 188 maintaining RTD 182 and junction box 184. As discussed above with reference to FIG. 11, two multivariable transmitters 180 could be utilized to extend the turndown of device 30.

An advantage for non-multivariable transmitter systems, where a simple differential pressure transmitter is used in conjunction with a static pressure transmitter, may be realized utilizing the device of this invention by allowing the upstream static pressure penetration of conduit 42 to be omitted. In such an embodiment, a simple differential pressure transmitter used in conjunction with a static pressure transmitter would be associated with instrument head 82, applying a tee above hole 119 to communicate with the respective differential pressure and static pressure transmitters (as would be apparent to those skilled in the art).

Figure 15:
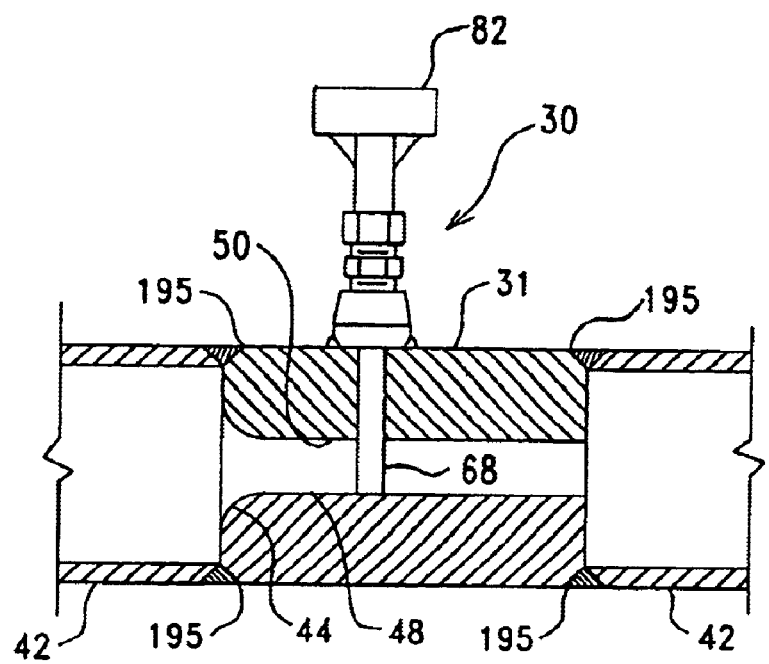
FIGS. 15 through 18 are partial sectional illustrations showing different installation modes and configurations for the device of this invention.
Figure 16:
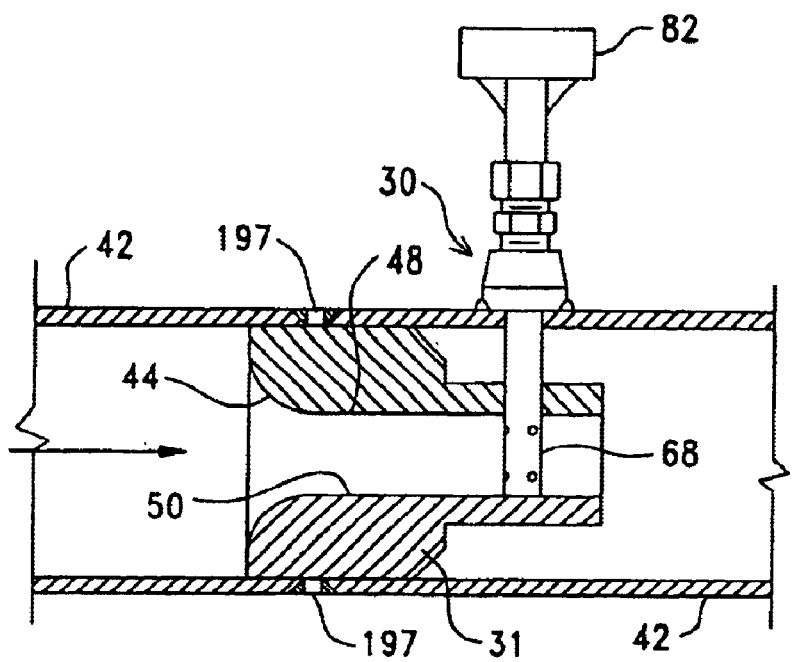
Figure 17:
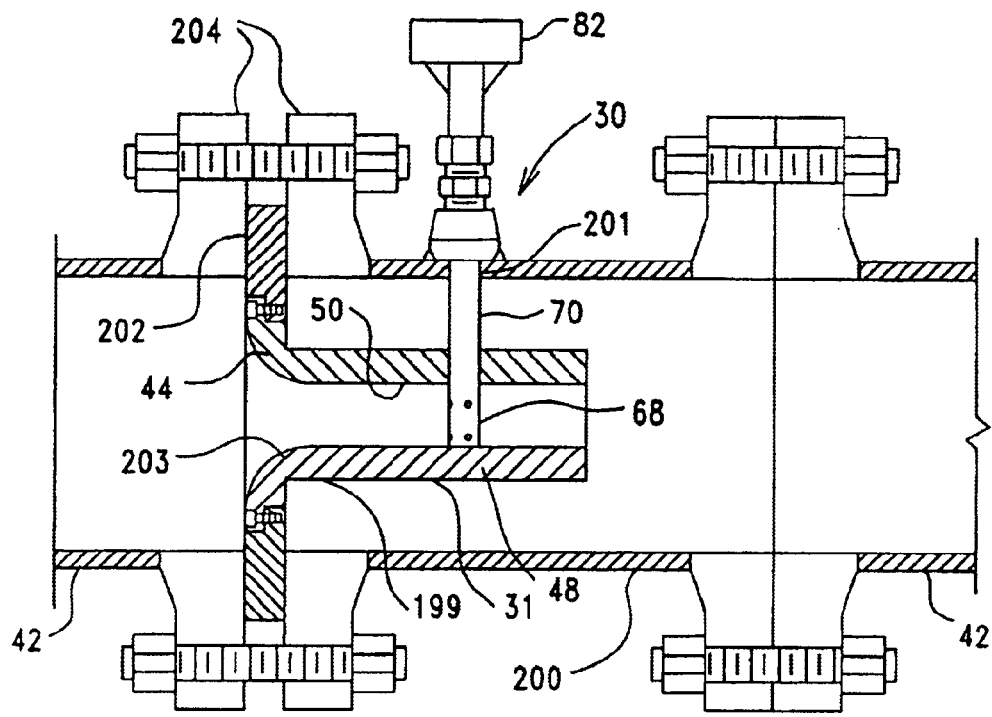
Figure 18:
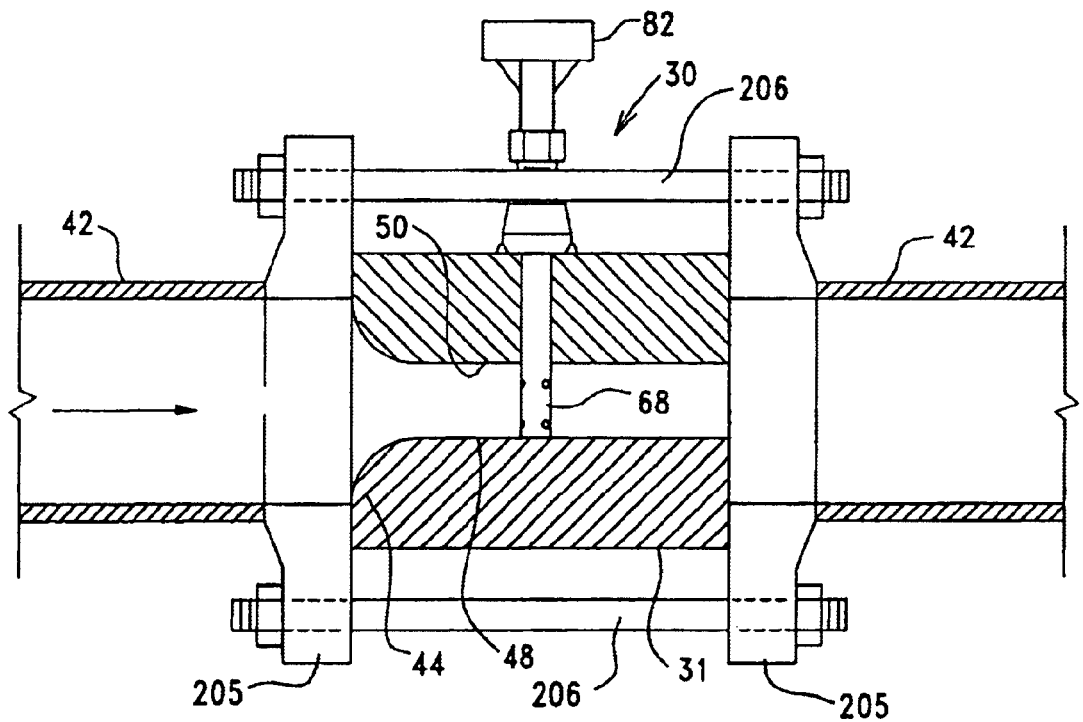

FIGS. 15 through 18 disclose various additional configurations and methods allowing connecting of meter body 31 of device 30 in conduit 42. FIG. 15 shows meter body 31 with bevels 195 for welding to correspondingly beveled conduit 42. FIG. 16 shows a weld-in wherein welding boss 197 traverses the circumference of meter body 31 permitting welding at conduit 42. FIG. 17 shows a flanged meter section 199 at accelerator section 44 and with linear conduit section 50 resident within larger conduit section 200 equivalent in diameter to conduit 42 having an aligned opening 201 for receipt and sealing thereat of pitot tube 70 of averaging pitot 68. Flanged section 199 includes flange unit 202 bolted to accelerator/flow conditioner unit 203. Section 199 is held at annular flanges 204, thereby allowing removal of section 199 and replacement of unit 203 at flange unit 202 (with a replacement unit or differently sized unit having different flow characteristics, for example). FIG. 18 shows a wafer configuration of body 31 held at conduit 42 between two flanges 205 and securing rod/nut combinations 206.

Figure 19:
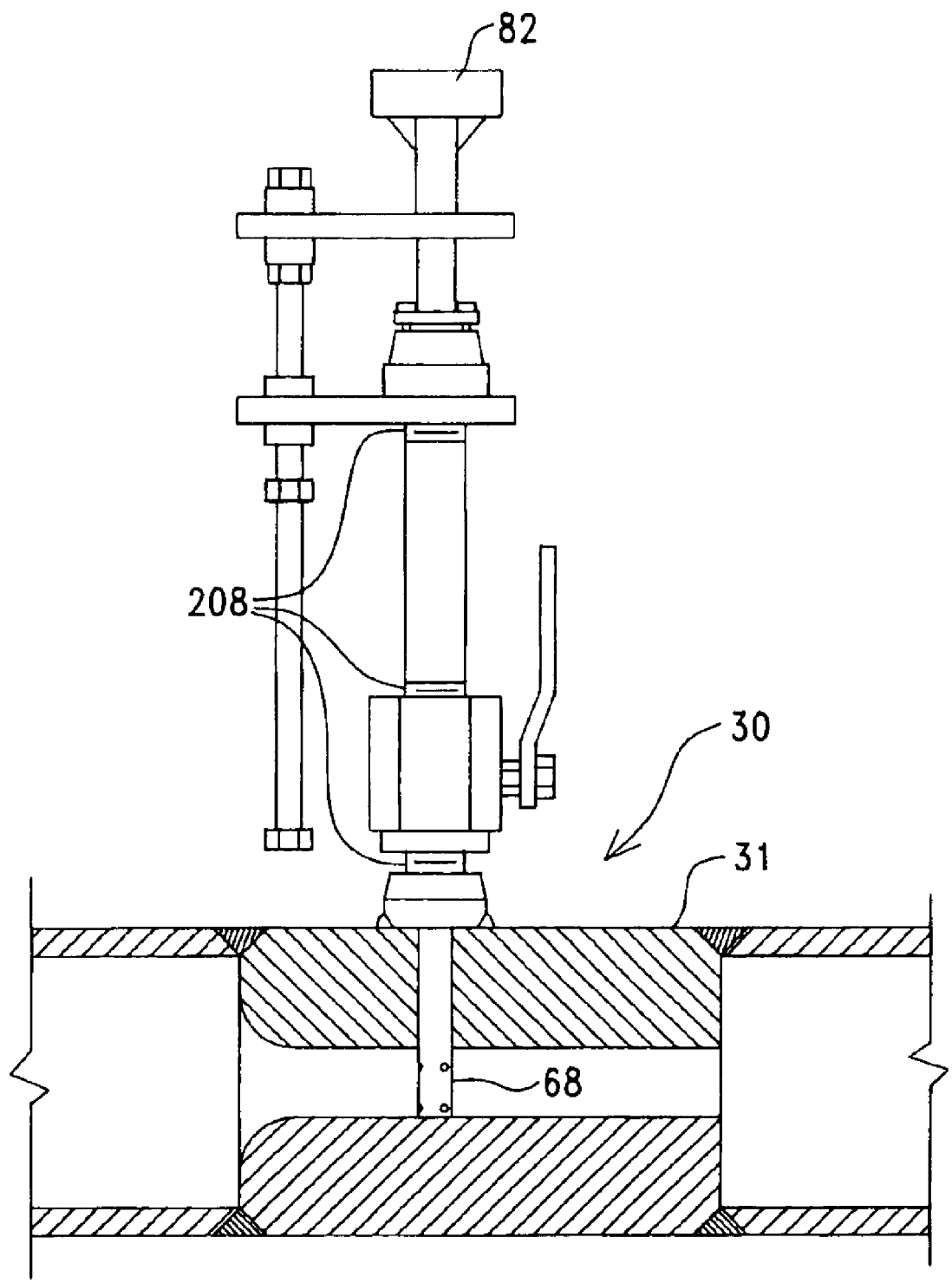
FIGS. 19 through 21 are partial sectional illustrations showing different single tap pressure sensing instrument installations in the device of this invention.
Figure 20:
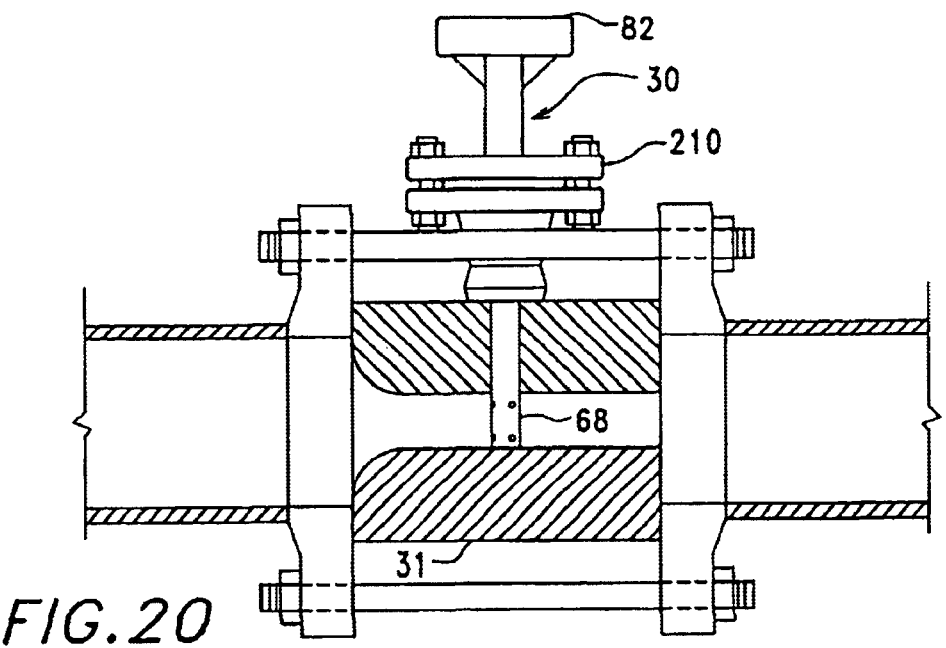
Figure 21:
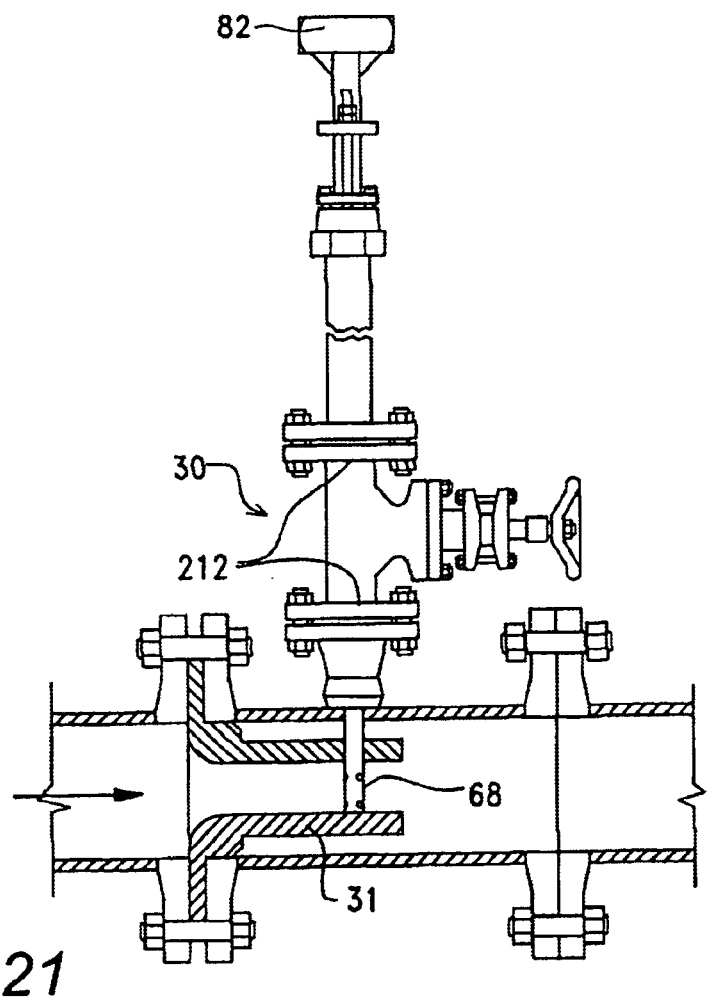

FIGS. 19 through 21 show a few of the various alternative mountings of averaging pitots, in particular those allowing ready insertion and removal from meter body 31. FIG. 19 illustrates a weld-in meter body 31 (as shown in FIG. 15) with a hot tap model with threaded connections 208 that permits averaging pitot 68 to be inserted and retracted under full process pressure. Wafer body configuration of meter body 31 (as discussed with reference to FIG. 18) is shown in FIG. 20 with a flanged section 210 allowing separation of averaging pitot 68 from instrument head 82. In FIG. 21, a pipe section with a hot tap model and flanged connections 212 is shown that permits averaging pitot 68 to be inserted and retracted under full process pressure.

While use of an averaging pitot (square root meter) has been disclosed herein to provide flow rate or other measurements, a target meter measuring deflection of a disc placed within conduit section 50 of meter body 31 could be utilized, as could a simple single point pitot. Moreover, the device of this invention can be configured for use with linear devices that produce a signal linear to the flow rate (such as a vortex meter, thermal dispersion meter, magnetic meter, or ultrasonic meter device). Additionally, the various instrument valve manifolds shown herein can be configured to be integral to instrument head 82.

As may be appreciated from the foregoing, devices and methods for fluid characteristic measurement using fluid acceleration are proposed which have greatly enhanced accuracy and utility (turndown). The device includes a fluid flow accelerator and conditioner providing a settling distance in advance of characteristic measurement whereby the fluid is accelerated (over two times pipe line velocity), stabilized, and the velocity profile of which is linearized. The device is highly accurate (to about 1.0%) and repeatable (to about 0.1%), requires no calibration, has a turndown up to and exceeding about 25 to 1 (typically exceeding 50 to 1, some testing as high as 100 to 1), and has a low signal to noise ratio. The device requires very little straight pipe run in advance of the device for accurate readings (reducing heretofore known straight run requirements by up to 80%) and may be deployed with very low pressure loss. The device is particularly useful in applications that do not provide sufficient fluid velocity to produce a readable signal.

What is claimed is:

1. A device enabling flowing fluid characteristic measurement in a conduit comprising:

a flow accelerator and conditioner connectable in the conduit and having a converging inlet configured to accelerate flow of substantially all fluid flowing in the conduit therethrough and a linear section having a substantially constant cross section extending downstream from said inlet, said linear section having an opening thereat spaced from said inlet a sufficient distance selected to allow stabilization and linearization of flow of the fluid before passage in said linear section by said opening; and a measuring instrument having a portion maintained through said opening and extending into said linear section of said flow accelerator and conditioner for taking fluid characteristic measurements thereat.

2. The device of claim 1 wherein said portion of said instrument is characterized by being a single tap unit for measuring high and low pressures thereat without need of a separate upstream or downstream tap.

3. The device of claim 1 further comprising insertion/retraction means at said linear section of said flow accelerator and conditioner for allowing insertion or retraction of said portion of said instrument at said linear section under full process pressure.

4. The device of claim 1 wherein said linear section of said flow accelerator and conditioner has a diameter and wherein said sufficient distance is at least equal to one of about one said diameter or about two inches.

5. The device of claim 4 wherein said linear section is of a length sufficient so that said substantially constant cross section is maintained downstream of said opening for a selected distance at least equal to one of about one said diameter or about two inches.

6. The device of claim 1 wherein said portion of said instrument, is an averaging pitot having upstream facing high pressure ports and lateral low pressure ports.

7. The device of claim 6 wherein said averaging pitot has side walls extending downstream from said upstream facing high pressure ports to a rear wall portion, said side walls having a slightly divergent angle relative to one another, said low pressure ports positioned at said sidewalls forward of said rear wall portion.

8. A device for enhancing performance of a single tap fluid flow measuring unit postionable in a conduit comprising:

a convergent section at the conduit providing a first selected restriction of normal flow of substantially all fluid flowing through said conduit thereat to accelerate fluid flow;

a linear conduit section extending downstream from said convergent section and having a constant diameter smaller than diameter of the conduit, an opening thereinto being established at a selected location along said linear conduit section spaced from said convergent section configured for receipt of the measuring unit, said constant diameter selected to provide a second selected restriction of flow at the measuring unit when installed, said selected flow restrictions balanced to contribute to conditioning of fluid flow and to enhance measurement accuracy while still allowing for adequate throughflow; and securing means adjacent to said opening for receiving and securing the measuring unit at said opening.

9. The device of claim 8 wherein said convergent section includes a mounting surface, a face positionable at nearly a 90° angle to fluid flow in the conduit and a defined radius between said face and said constant diameter of said linear conduit section.

10. The device of claim 9 wherein an abrupt discontinuity is defined at intersection of said defined radius and said face.

11. The device of claim 8 wherein said linear conduit section resides within the a larger conduit section having a diameter equivalent to diameter of the conduit.

12. The device of claim 8 further comprising mounting means at opposite ends of said device for location and securement of said device at the conduit.

13. The device of claim 8 wherein said linear conduit section has an outlet end and wherein said opening is positioned at said linear conduit section a distance equal to or greater than one of about one said constant diameter or about two inches from said outlet end.

14. A device enabling flowing fluid pressure measurements in a conduit having a diameter comprising:

accelerator means at the conduit for increasing fluid flow velocity by cross sectional area restriction to a lesser diameter;

flow conditioning means for conditioning flow of the fluid and associated at one end with said lesser diameter of said accelerator means and having an outlet end, said flow conditioning means having an opening between said ends with a linear length upstream of said opening selected so that internal energy, static pressure and velocity vectors of said fluid can stabilize and linearize after fluid passage through said accelerator means and in advance of said opening;

pressure measuring means having a portion through said opening at said flow conditioning means with ports locatable in the fluid flowing through said flow conditioning means for measuring pressure thereat, said portion within said flow conditioning means presenting a blockage area; and said lesser diameter, said length and said blockage area selected so that an operating range of the device up to at least about a 25 to 1 turndown in flow with a constant flow coefficient independent of fluid flow velocity or Reynolds number is achievable.

15. The device of claim 14 wherein said turndown is up to and exceeding about 50 to 1.

16. The device of claim 14 wherein said pressure measuring means includes a single tap unit with said portion having an upstream facing high pressure port and a low pressure port, said lesser diameter and said blockage area selected so that readings at said high pressure port are in substantial agreement with upstream static pressure in the conduit.

17. The device of claim 16 wherein said lesser diameter and said blockage area are configured so that said substantial agreement is to about 0.2%.

18. The device of claim 16 wherein said portion of said pressure measuring means includes an averaging pitot for averaging high and low pressures measured in said flow conditioning means.

19. The device of claim 18 wherein said pressure measuring means further includes a multivariable transmitter associated with said averaging pitot.

20. A method for enabling characteristic measurement of fluid flowing at a velocity in a conduit comprising the steps of:

increasing said velocity;

conditioning flow of fluid so that internal energy, static pressure and velocity vectors of said fluid stabilize and linearize after increasing said velocity;

sensing in the velocity increased and flow conditioned fluid flow to enable measurement of said characteristic; and measuring said characteristic over an operating range characterized by up to at least about a 25 to 1 turndown in flow capability with a constant flow coefficient independent of fluid flow velocity or Reynolds number.

21. The method of claim 20 wherein the step of sensing in the flow includes sensing high and low pressure readings, said readings averaged at the flow.

22. The method of claim 21 wherein the step of sensing in the flow is characterized by said high pressure readings being in substantial agreement with upstream static pressure in the conduit.

23. The method of claim 20 further comprising the step of maintaining velocity profile of the fluid flow after sensing.

24. The method of claim 20 wherein no more than two conduit diameters of straight running conduit is required in advance of sensing in the flow.

25. The method of claim 20 wherein the step of increasing said velocity includes the step of restricting fluid flow.

26. The method of claim 25 wherein the step of conditioning flow of fluid includes the step of maintaining an increased velocity of fluid flow past point of sensing in the flow.

27. The method of claim 26 wherein the steps of restricting fluid flow and maintaining increased velocity of fluid flow include reducing diameter of a flow path relative to diameter of the conduit and maintaining said reduced diameter beyond said point of sensing in the flow.

28. The method of claim 27 wherein said reduced diameter is established and linearly maintained for a distance at least equal to one of about one said reduced flow path diameter or about two inches in advance of said point of sensing in the flow.

29. The method of claim 20 wherein said operating range is further characterized by capability exceeding a 50 to 1 turndown.

* * * * *